(No Model.)
J. W. MARTIN.
WAGON BRAKE.
No. 381,502. Patented Apr. 17, 1888.
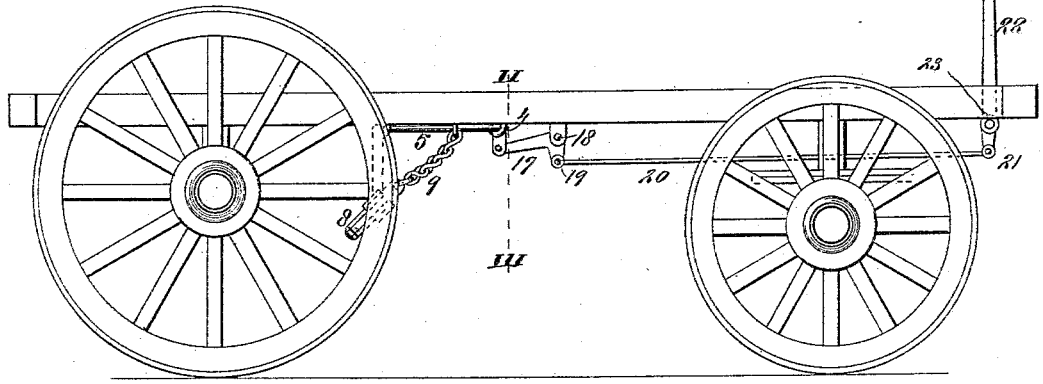
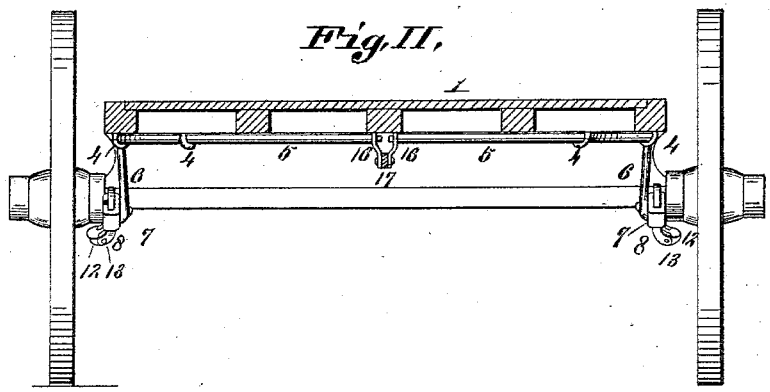 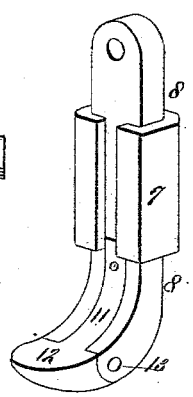
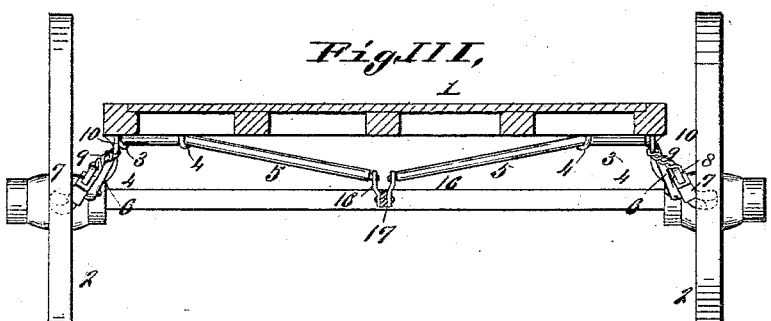 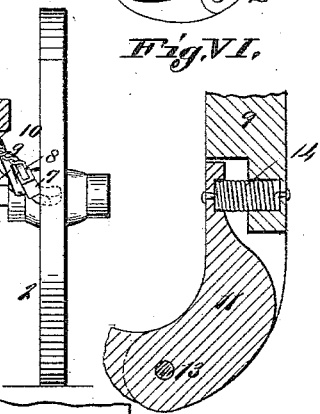
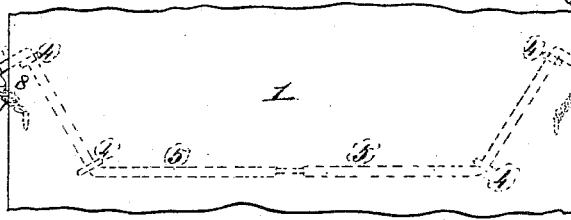
Attest:
L. W. Hopkins
E. Arthur.
Inventor:
John W. Martin
By Knight Bros.
att'ys
N. PETERS, Photo-Lithographer, Washington, D. C.

UNITED STATES PATENT OFFICE.

JOHN W. MARTIN, OF ST. LOUIS, MISSOURI, ASSIGNOR, BY DIRECT AND MESNE ASSIGNMENTS, OF ONE-THIRD TO ASA S. MASON, OF SAME PLACE.

WAGON-BRAKE.

SPECIFICATION forming part of Letters Patent No. 381,502, dated April 17, 1888.

Application filed May 3, 1887. Serial No. 236,975. (No model.)

*To all whom it may concern:*

Be it known that I, JOHN W. MARTIN, of the city of St. Louis, in the State of Missouri, have invented a certain new and useful Improvement in Vehicle-Brakes, of which the following is a full, clear, and exact description, reference being had to the accompanying drawings, forming part of this specification, and in which—

Figure I is a side elevation of a wagon provided with my improvement. Figs. II and III are transverse sections taken on line II III, Fig. 1, Fig. III showing the brakes applied and Fig. II showing them removed. Fig. IV is a detail top view with the brakes thrown out into using position. Fig. V is an enlarged perspective view of one of the hooks of the brake. Fig. VI is an enlarged detail section of same.

My invention relates to certain improvements in brakes intended more particularly for use on wagons and heavy vehicles; and my invention consists in features of novelty, hereinafter fully described, and pointed out in the claims.

Referring to the drawings, 1 represents the bed, and 2 the running-gear, of a wagon.

3 represents rock-shafts secured to the under side of the bed of the wagon by staples 4, the shafts having extensions 5 on their inner ends and extensions 6 on their outer ends. The shafts themselves preferably extend diagonally of the bottom, as shown by dotted lines in Fig. IV, and the extensions 5 transversely of the bottom. The extensions 6 are preferably at right angles to the shafts proper. On the outer ends of the extensions are clips or keepers 7, in which fit and slide hooks 8, connected at their inner ends by means of chains 9 to the bed at 10. Each hook is preferably slotted to receive a tongue, 11, the outer end, 12, of which is curved to conform to the shape of the hook, as shown in Fig. V. The tongues are pivoted in the hooks by pins 13, and their upper ends are connected to the hooks by springs 14, which hold them in normal position.

Connected to the inner ends of the extensions 5 of the shafts by means of links 16 is a bell-crank lever, 17, which is pivoted at 18 to the wagon-bed, and which is connected by its other end at 19 to a pull-rod, 20, the other end of which is made fast at 21 to a lever, 22, pivoted at 23 to the wagon-bed.

The operation is as follows: When it is desired to apply the brake, the lever 22 is moved in the direction indicated by the arrows in Fig. I, thus pulling the extensions 5 of the shafts 3 into the position shown in Fig. III, and as this is done the shafts 3 are rocked and the hooks are thrown out from the position shown in Fig. II to the position shown in Fig. III and engaged with the wheels at the junction of the spokes with the rim. Then, as the wagon is moved, the wheels are locked and kept from turning by the hooks and the chains 9. To remove the hooks, it is simply necessary to move the lever 22 in the other direction, and in order that the hooks can be removed without backing the wagon I pivot the tongues 11, (which form the outer ends of the hooks,) as stated, to the body of the hooks and provide the spring 14. Now, as the hooks are being removed, the springs 14 will yield, allowing the points of the tongues to pass out of engagement with the wheel, and then the springs 14 will draw them into normal position. With this arrangement the wheels can be positively locked and held from turning with very little trouble and without the driver dismounting from his wagon.

I claim as my invention—

1. The combination, in a wagon-brake, of a rock-shaft, mechanism for turning the shaft, and a hook secured to the shaft at angles thereto, the whole being arranged substantially as and for the purpose set forth.

2. The combination, in a wagon-brake, of the rock-shafts, mechanism for turning the shafts, hooks secured to the shafts, and chains connecting the hooks to the wagon-bed, substantially as and for the purpose set forth.

3. The combination, in a wagon-brake, of the rock-shafts, mechanism for turning the shafts, hooks movably secured to the shafts, and chains connecting the hooks to the wagon-bed, substantially as set forth.

4. The combination, in a wagon-brake, of the rock-shafts, means for turning the shafts, hooks connected to the shafts at angles thereto, and spring-tongues pivoted to the hooks, substantially as and for the purpose set forth.

5. The combination, in a wagon-brake, of the rock-shafts, means for turning the shafts, clips on the outer ends of the shafts, hooks located in the clips, chains connecting the clips to the wagon-bed, tongues pivoted to the hooks, and springs connecting the tongues to the body of the hooks, substantially as and for the purpose set forth.

6. The combination, in a wagon-brake, of the hooks, rock-shafts to which the hooks are secured, having extensions 5 6, bell-crank lever pivoted to the wagon-bed, tongues to which the shafts are connected, rod 20, and pivoted lever 22, substantially as and for the purpose set forth.

7. In a wagon-brake, in combination with the sliding hooks and means for operating the hooks, the hinged spring-tongues pivoted to the hooks, substantially as and for the purpose set forth.

JOHN W. MARTIN.

In presence of—
  GEO. H. KNIGHT,
  EDW. S. KNIGHT.